(12) United States Patent
Fujiyoshi

(10) Patent No.: US 6,452,674 B1
(45) Date of Patent: Sep. 17, 2002

(54) IN-SITU WAVE CORRECTION APPARATUS

(75) Inventor: Kenichi Fujiyoshi, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/175,290

(22) Filed: Oct. 20, 1998

(30) Foreign Application Priority Data

Oct. 21, 1997 (JP) ............................................. 9-288857

(51) Int. Cl.$^7$ ................................................. G01J 3/18
(52) U.S. Cl. ...................................... 356/328; 356/334
(58) Field of Search ................................. 356/326, 328, 356/331, 332, 334

(56) References Cited

U.S. PATENT DOCUMENTS

| | | | |
|---|---|---|---|
| 4,681,444 A | * 7/1987 | Ferber et al. | 356/326 |
| 4,779,216 A | 10/1988 | Collins | 364/571.02 |
| 5,557,404 A | 9/1996 | Matsui et al. | 356/319 |

FOREIGN PATENT DOCUMENTS

| | | | |
|---|---|---|---|
| DE | 3641017 | 12/1986 | G01N/21/17 |
| DE | 19639939 | 9/1996 | G01J/3/04 |
| EP | 0618653 | 7/1997 | H01S/3/133 |
| EP | 0800066 | 10/1997 | G01J/3/28 |
| GB | 2293650 | 4/1996 | G01J/3/06 |

* cited by examiner

Primary Examiner—F. L. Evans
(74) Attorney, Agent, or Firm—Darby & Darby

(57) ABSTRACT

A wavelength correction apparatus automatically corrects a deviation of a testing wavelength from a reference spectrum analyzer installed on-site. The apparatus is constructed of a reference light source 62 for outputting a reference light of a specific wavelength; a light input terminal 50 for inputting a testing light whose wavelength is to be measured and compensated; an optical switch 54 for receiving the testing light and the reference light so as to output one either the testing light or the reference light; a control section 60 for controlling the operations of the reference light source 62 and the optical switch 54; and an optical spectrum measuring device 58 for measuring optical spectra output from the optical switch 54 and for operating the control section 60 at a point in time specified by an operator. The in-situ wavelength correction device produce precise compensates for wavelength deviation so that a compact wave correction apparatus can be used on-site of optical communications stations.

5 Claims, 3 Drawing Sheets

TO CONTROL SECTION 60

IN-SITU WAVE CORRECTION APPARATUS

BACKGROUND OF THE INVENTION

1. Field of the Invention

The present invention relates to a wave correction apparatus, and relates in particular to a compact wavelength correction apparatus which automatically detects and compensates for wavelength deviation.

2. Description of the Related Art

As known generally, optical spectrometer or spectrum measuring device is an apparatus for determining wavelength or frequency components contained in a beam of light output from a light source.

Spectrum measuring device is comprised by an input slit for inputting light to be analyzed, a diffraction grating element for spectral dispersion of input light, and an output slit for outputting only a portion of the waves separated by the diffraction grating.

To determine a spectrum of light used for communication purposes, for example, the operator first decides the frequency range to be scanned, and while rotating the diffraction grating with respect to the input light, wave components output from the output slit are measured against time.

The angular frequency of the diffraction grating and the optical frequency are related directly one on one so that the output data is related to the spectrum of the input light.

Lately, because of advances in optical communication technologies, high precision is demanded in spectrometer performance, and as the spectrum measuring precision is increased, it has become necessary to take into account possible errors in measurements introduced by changes in ambient conditions of the measuring apparatus (for example, temperature variations within the spectrometer).

SUMMARY OF THE INVENTION

It is an object of the present invention to provide an wavelength correction apparatus that enables a deviation between a testing wavelength and a reference wavelength to be compensated on-site, automatically, using an in-situ spectrometer installed within the apparatus.

The object has been achieved in a wavelength correction apparatus for correcting a deviation of a testing wavelength from a reference wavelength, comprising: a reference light source for emitting reference light of a specific wavelength; a light input terminal for inputting a testing light whose wavelength is to be measured and compensated, if required; an optical switch for receiving the testing light and the reference light and outputting one of either the testing light or the reference light from an output terminal; a control section for controlling operations of the reference light source and the optical switch; and an optical spectrum measuring device for measuring optical spectrum output from the optical switch, and for activating the control section at scheduled times specified by an operator.

According to the apparatus, corrective steps can be taken automatically at any desired time, therefore, correction process is significantly facilitated and made more convenient.

Also, because the reference light source is a type that permits a compact arrangement, the installation space need not be very large, making the apparatus quite adaptable to many practical situations.

Also, because the correction process can be carried out automatically at any desired time, the process can be carried out even when the apparatus is being used to perform spectral measurements.

The optical spectrum measuring device may be comprised by: an optical element for transforming light input from an input section into parallel light; a diffraction grating for receiving the parallel light and producing spatially separated waves; an optical condensing element for concentrating the spatially separated waves on an output slit; a photodetector forconverting light exiting from the output slit into electrical signals; a conversion section for converting analogue signals output from the photodetector into digital signals; and a processing section for varying an orientation angle of the diffraction grating and for performing computational processing of the digital signals so as to produce an optical spectrum of the testing light.

The optical spectrum measuring device may include a timer means having calendar functions, and may operate the control section according to signals output from the timer means at schedules times.

The optical spectrum measuring device may include a timer means having calendar functions, and may operate the control section when signals output from the timer means indicates that a specific time interval has elapsed since the apparatus was powered.

The reference light source may be comprised by: a light emitting diode for emitting light of specific wavelengths; an optical element for transforming light output from the light emitting diode into parallel light; a gaseous absorption cell for absorbing light of a specific wavelength from light transmitted through the optical element; a condensing element for concentrating the light transmitted through the gaseous absorption cell for input into the optical switch.

DESCRIPTION OF THE PREFERRED EMBODIMENTS

Before presenting the details of the present invention, an optical spectrum generation apparatus which forms the basis of the present invention will be explained first.

Figure 4:
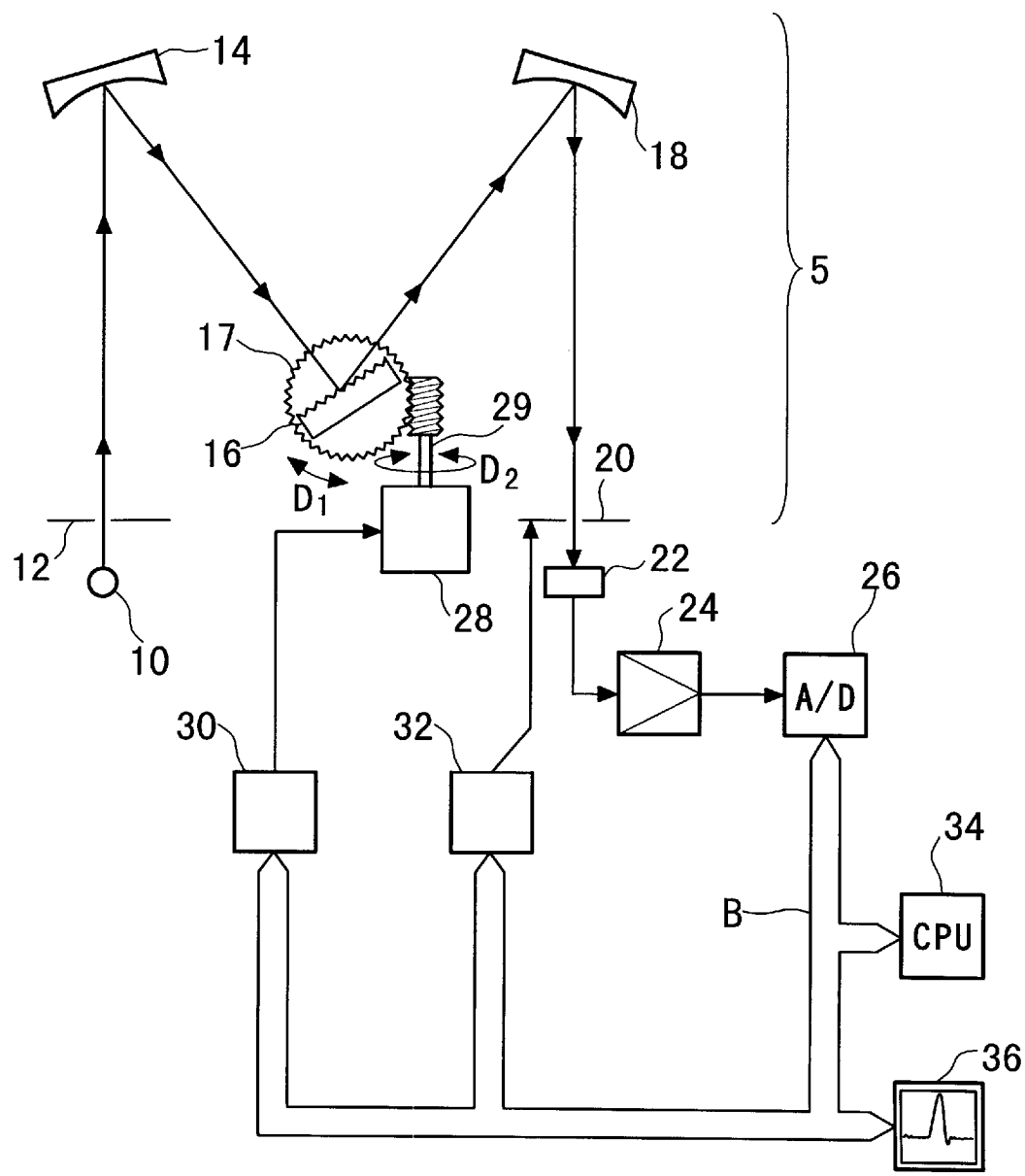
FIG. 4 is a schematic diagram of the arrangement of a conventional optical spectrum measuring device which forms the basis of the optical spectrum measuring apparatus of the present invention.

FIG. 4 shows a block diagram of the basic optical spectrometer apparatus upon which the present invention is based. The apparatus includes a light source 10 which inputs test light containing component waves of various wavelengths to be analyzed, an input slit 12 which limits the spread width of the light output from the light source 10, and a concave mirror 14 which transforms the light input from the input slit 12 into parallel light.

A diffraction grating 16 has a plurality of grooves fabricated on the surface and separates the parallel light into spatially separated waves of different wavelengths. The diffraction grating 16 is disposed on a swing stage 17 which is able to oscillate in the directions indicated by bi-directional arrows D1, and oscillates concurrently with the swing stage 17. Of the various spatially separated waves produced by the diffraction grating 16, only those waves input into a concave mirror 18 are focused on an output slit 20, which limits the wavelength band of the light focused on the slit location.

The input slit 12, concave mirror 14, diffraction grating 16, concave mirror 18 and output slit 20 comprise a distributed spectrometer known as Czemy-Turner type.

A photodetector 22 such as photodiode is used to convert an optical power of the light output from the output slit 20 into electrical signals which are amplified in an amplifier 24. Amplified signals are converted to digital signals in an analogue-to-digital converter (referred to as A/D converter) 26.

In FIG. 4, a motor 28 operates the swing stage 17 to which is attached the diffraction grating 16, and by oscillating the motor 28 in the direction of a bi-directional arrow D2, the swing stage 17 and diffraction grating 16 are oscillated in the directions shown by the arrow D1. A motor drive circuit 30 is used to control the swing action of the drive shaft 29 of the motor 28 according to the control signals output from a CPU 34. Details of CPU 34 will be presented later.

A slit width control device 32, to be described later, changes the width of the output slit 20 according to control signals output from CPU 34.

A display device 36, such as cathode ray tube (CRT) and liquid crystal display, displays the resulting spectra. CPU 34 is connected to the A/D converter 26, motor drive circuit 30, slit width control device 32 and display device 36 through bus B, and outputs control signals to control the operation of motor drive circuit 30 and slit width control device 32, processes digital signals output from the A/D converter 26, and displays a spectral distribution, for example, on the display device 36.

The operation of the spectrometer will be described. Testing light output from the light source 10 is input into the input slit 12. After passing through the input slit 12, the light is transformed into parallel light in the concave mirror 14 and is directed to the diffraction grating 16. The diffraction grating 16 is rotated by the motor 28 about the center axis which is parallel to a plurality of grooves formed on the surface, and is oriented at a suitable angle with respect to the parallel light. The orientation angle is controlled by the action of the motor drive circuit 30 which controls the motor 28 according to the control signal output from CPU 34.

Diffraction grating 16 spatially separates parallel light into waves of various wavelengths. Of the various spatially separated waves produced by the diffraction grating 16, only those waves, which are produced according to the angle of orientation of the diffraction grating 16 with respect to the parallel light, are directed to the concave mirror 18. Concave mirror 18 condenses only those waves received from the diffraction grating 16 on the output slit 20. Only those waves within the range of width of the output slit 20 are transmitted. Slit width control device 32 selects a width of the output slit 20 under the command of CPU 34.

Photodetector 22 receives light transmitted through the output slit 20 and converts light power into electrical signals in proportion to the light power. Amplifier 24 amplifies the analogue signals from the photodetector 22 to a voltage level compatible with the operation of the A/D converter 26. A/D converter 26 converts analogue signals output from the amplifier 24 into digital signals. Digital signals output from the A/D converter 26 are input into CPU 34 and subjected to computation operations. The results of computation (spectral distribution, for example) are sent through bus B to be displayed on the display device 36. Display device 36 displays results according to computations performed by CPU 34.

Next, measurement steps will be explained. First, CPU 34 outputs control signal to slit width control device 32 to select a width for the output slit 20. Next, CPU 34 commands motor drive circuit 30 to vary the orientation angle of the diffraction grating 16 so as to select wavelengths to be transmitted through the output slit 20, and receives values of optical power of the transmitted waves in the form of digital output signals from the A/D converter 26. CPU 34 outputs control signals to motor drive circuit 30 so as to scan from the starting wavelength to the ending wavelength, and repeated results of measurement produce a characteristic curve of wavelengths and corresponding optical powers, which are displayed as an optical spectrum of a given range of waves on the display device 36.

CPU 34 shown in FIG. 4 has memorized correlation between the rotational angles of the motor 28 (number of pulses output to the motor 28) and the wavelengths transmitted through the output slit 20, so that a target wavelength specified by the operator can be established according to the memory data.

However, in the spectrographic apparatus shown in FIG. 4, because of minute drifting in the setting of the orientation angle of diffraction grating 16 and concave mirrors 14, 18 (caused by minute changes in ambient temperature in the apparatus and the duration of operation of the drive device for the diffraction grating 16), the original correlation between the wavelengths for a given orientation angle of the motor 28 can become invalid. This means that, even though CPU 34 establishes a target wavelength according to the value specified by the operator by controlling the angle of the diffraction grating 16, the actual wavelength transmitted through the spectrometer can be different.

The deviation in the output wavelength thus produced can be compensated by re-orienting the diffraction grating 16. In the past, this corrective task has been performed by using a monochromatic light source, such as a gas laser, of a given output wavelength so that reference light can be input from an external source into input slit 12 or, through an optical fiber of the apparatus, shown in FIG. 4, if it is provided with an optical connector. Output spectrum from the output slit 20 is then determined, and the orientation angle of the diffraction grating 16 is adjusted so as to reduce the wavelength deviation to zero.

There are examples of such corrective work being performed while the laser light from the gas laser is being injected into the spectrometer, if the operator commands CPU 34 to produce the spectrum and to automatically adjust the motor drive circuit 30 to adjust the angle of the motor 28 according to a pre-loaded correction program.

However, this approach is laborious because it is still necessity for the operator to physically connect the reference light source to the apparatus before the CPU 34 can execute the corrective program.

Also, in the conventional approach, it is necessary for the operator to decide whether a corrective action is necessary by constantly tracking the time elapsed from the previous correction, and remembering how the ambient conditions have changed from the previous situation.

Also, gas lasers are generally very bulky (overall length can be 1 meter in the case of a He—Ne laser emitting at 1523 nm), and it is often difficult to bring such an equipment to where a spectrometer is installed. For such reasons, it is not possible to perform on-site correction for an installed and operating spectrometer.

There have been increasing needs in such fields as wave division multiplexed signal technology to know the precise value of the operating wavelengths, and spectrum measuring apparatus in such applications is required to minimize drift in any components in the apparatus. Also, there have been increasing needs for the spectrometers to be used on-site of data transfer operations, so that the operating wavelength can be checked and compensated on-site of the communication equipment.

The wavelength correction apparatus of the present invention has been developed in view of the problems discussed above so that an in-situ spectrum measuring device can automatically compensate for a minute drift in the spectrometer performance from a target wavelength by admitting the operating light into the apparatus as testing light.

An embodiment of the wave correction apparatus of the present invention will be presented in detail below with reference to FIGS. 1 to 3.

Figure 1:
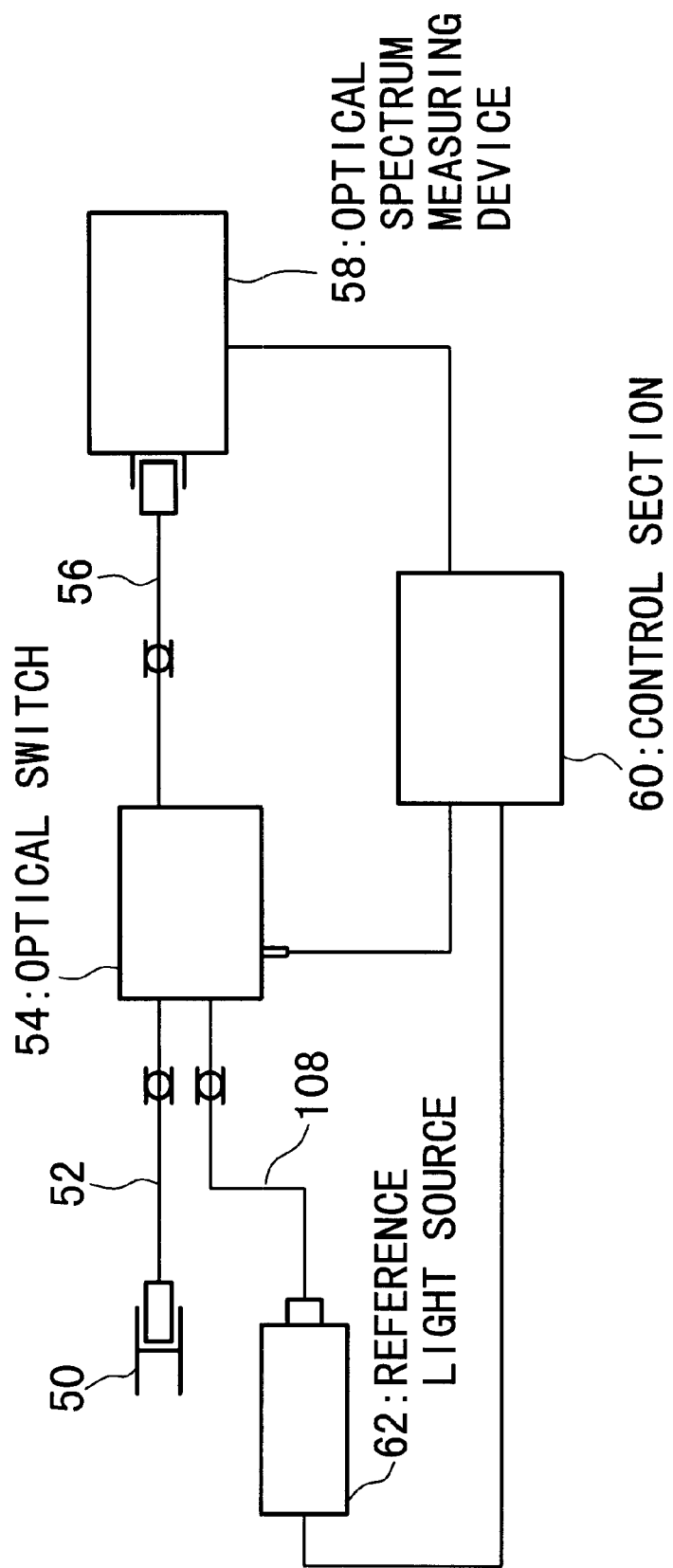
FIG. 1 is a block diagram of the arrangement of an embodiment of the wavelength correction apparatus of the present invention.

FIG. 1 is a block diagram of an embodiment of the wavelength correction apparatus of the present invention. In FIG. 1, a light input terminal 50 is used to admit an operating light whose wavelength is to be checked for accuracy. A test light fiber 52 is attached to the light input terminal 50. An optical switch 54 has two input terminals and one output terminal, and connects one of the input terminals and the output terminal under the command of a control section 60, which will be described later, and outputs light input from either one of the two input terminals.

Output terminal of the optical switch 54 is connected to one end of a the fiber 56, and the other end of the fiber 56 is connected to an input terminal of the optical spectrum measuring device 58. Input terminal of the optical spectrum measuring device 58 corresponds to the input slit 12 in FIG. 4. FIG. 2 is a block diagram of the optical spectrum measuring device 58, and those parts of the apparatus which are the same as those in FIG. 4 will be given same reference numerals, and their explanations will be omitted.

Figure 2:
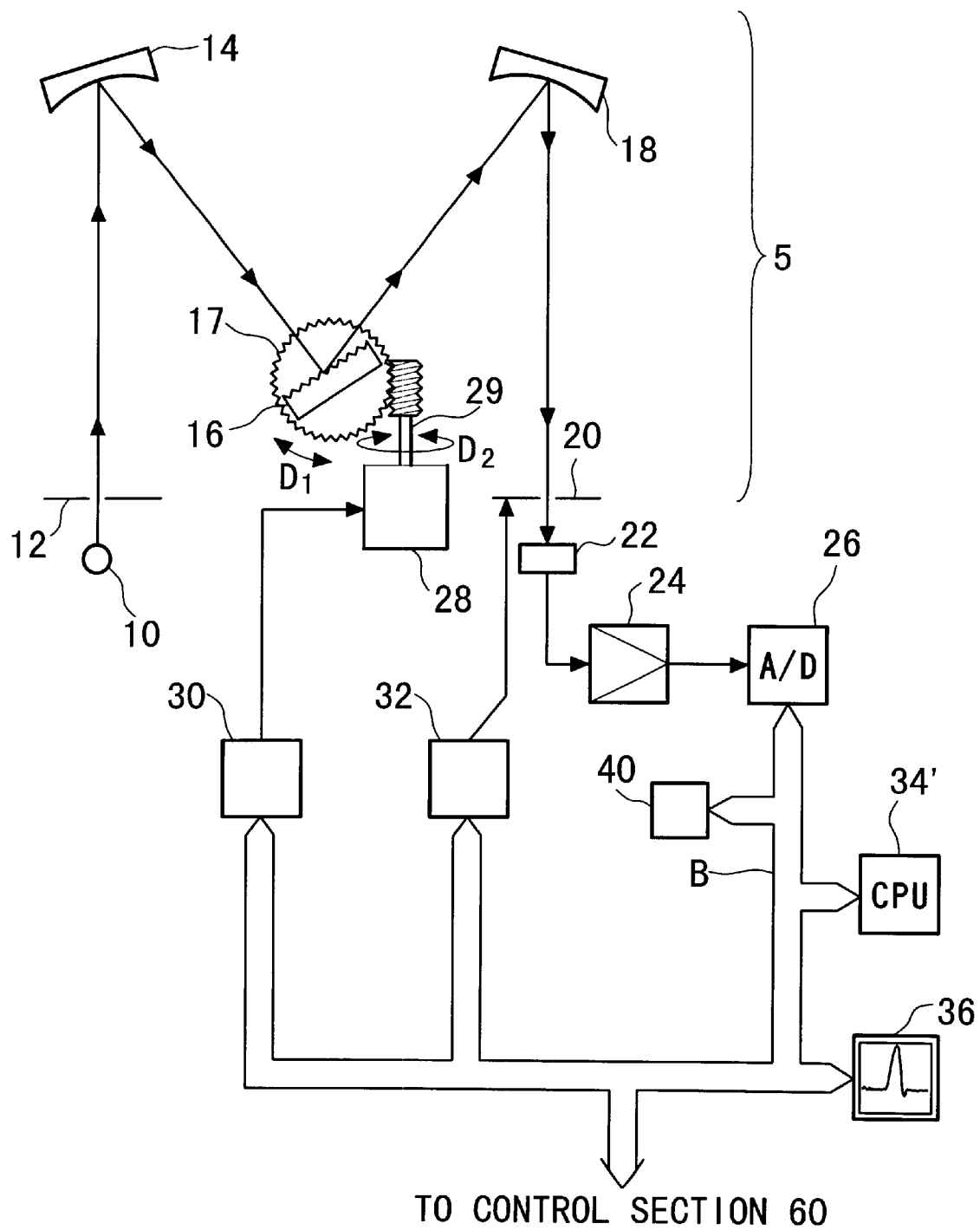
FIG. 2 is a schematic diagram of an optical spectrum measuring device 58.

As shown in FIG. 2, the present optical spectrum measuring device 58 has substantially the same construction as the device shown in FIG. 4. However, the present device 58 differs from the conventional device shown in FIG. 4 in the following aspects: (i) a timer 40 is provided to track date/time function, (ii) a bus B is provided to send control signals from CPU 34' to the control section 60 (to be explained later), and (iii) CPU 34 is replaced with CPU 34' which includes execution programs to adjust the setting in the device 58 to alter the wavelength transmitted precisely to the target value.

CPU 34' executes a program, according to chronological data output from the timer 40, to check and correct the device 58 according to the wavelength transmitted therethrough, when a certain amount of device usage is accumulated or at regular time intervals (for example, at one hour or one day intervals) desired by the operator.

Returning to FIG. 1 which relates to the present device 58, the control section 60 performs switching of input terminals of the optical switch 54 according to control signals output from the device 58. And, the control section 60 outputs control signals to control the action of a reference light source 62 according to the control signals. An example of the construction of the reference light source 62 is shown in FIG. 3. Center wavelength of the light output from the reference light source 62 is stored beforehand in CPU 34' of the device 58.

Figure 3:
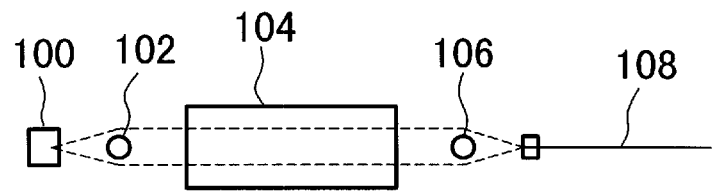
FIG. 3 is a schematic representation of a reference light source 62.

FIG. 3 shows a construction of the reference light source 62, including a light emitting diode (LED) 100 and a lens 102 to transform output light from LED 100 to parallel light. A gaseous absorption cell 104 absorbs a specific wavelength, and may be filled with acetylene gas, for example. Performance of the absorption cell 104 is quite stable, and is not affected by temperature changes and other ambient conditions. In other words, even when the ambient temperature changes, the center wavelength of the absorbed wave remains constant. The length of the absorption cell 104 is about 20 mm. Light output from the absorption cell 104 is condensed by a lens 106. The focal point of the lens 106 is arranged to be at the one end of the reference light fiber 108. Reference light fiber 108 is connected to the other input terminal of the optical switch 54.

The corrective operation of the embodiment of the wavelength correction apparatus will be explained below. The following explanation relates to a case of performing a correction within a certain period of time after the power is turned on to the spectrum measuring device 58.

First, when the device 58 is powered on and after a specific interval is elapsed according to the timer 40, CPU 34' provided in the device 58 starts execution of a corrective program. When the corrective program is started, first, CPU 34' outputs a control signal to the control section 60, which prompts outputting of a start signal to the reference light source 62, and upon receiving the start signal, LED 100 provided in the reference light source 62 begins emitting light.

Light output from LED 100 is transformed into parallel light by lens 102 and the gaseous absorption cell 104 absorbs light of a specific wavelength. Light transmitted through the absorption cell 104 is condensed by the lens 106, and is input into one end of the reference light fiber 108. Light input into the reference light fiber 108 propagates in the fiber 108 and enters into the optical switch 54.

In the meanwhile, control section 60 outputs a control signal to the optical switch 54 so as to optically connect the input terminal connected to the reference light fiber 108 with the output terminal of the device 58.

When the above series of steps are completed, the light output from reference light source 62 is input into the optical spectrum measuring device 58. At this time, CPU 34' commands the motor drive circuit 30 to rotate the motor 28 so as to vary the output light from the output slit 20 within a given range of wavelengths.

The action of CPU 34' to vary the wavelengths of light output from the output slit 20 produces a correlation between the wavelengths and the optical powers detected by the photodetector 22. According to the results so obtained, an absorption wavelength of light output from the output slit 20 is deduced. When the absorbed wavelength is determined, CPU 34' compares the pre-stored absorption wavelength for the reference light source 62 with the measured absorption wavelength. If there is a deviation in the two values, CPU 34' operates the motor drive circuit 30 so as to match the current absorption wavelength with the stored absorption wavelength of the reference light source 62.

To perform the adjustment, CPU 34' simply alters the orientation angle of the diffraction grating 16 by operating the motor 28. In other words, CPU 34' does not alter the pre-determined value of absorption wavelength but alters just the orientation angle of the diffraction grating 16.

The series of steps presented above perform matching of the current absorption wavelength output from the output slit 29 with the absorption wavelength output from the reference light source 62.

Also, when the corrective actions are taken as described above, because the orientation angle of the diffraction grating 16 is altered without altering the memory content in CPU 34', the memorized data between the angle of the diffraction grating 16 and wavelengths in CPU 34' are renewed according to the change made in the matching step so that the data can be referred to for a subsequent correction.

When the above series of steps are completed, CPU 34' outputs a control signal to the control section 60 so as to switch the light path from the output slit 20 back to the input terminal connected to the test light fiber 52 so that the current value of the operating wavelength of the testing light can be determined precisely. CPU 34' also outputs an end signal to the reference light source 62 to stop its operation.

As explained above, the present wavelength correction apparatus automatically performs standardization of the spectrum measuring device at a given elapsed time after the apparatus is powered, therefore, adjustment process is facilitated by eliminating the effort required to connect the reference light source to the spectrum measuring device and to adjust the angle of the diffraction grating.

Also, because the reference light source 62 is comprised by an LED 104 and a gaseous absorption cell 104, the reference light system can be made more compact compared with a system based on a gas laser.

Also, corrective step can be performed automatically at any desired interval, the spectrum measuring device can be employed at any desired occasion, even when it is installed in the field.

Further, although the above embodiment was illustrated by an example of a given elapsed time after the apparatus is powered, it is obvious that the apparatus can be operated at any intervals desired by the operator (for example, every hour or day).

Also, the interval for corrective steps can be chosen in a shorter time-frame than time of use or expected changes in ambient temperature, so that high measurement precision can always be assured.

Also, instead of the concave mirrors 14, 18, lenses can be used. Further, the output slit 12 in the measuring apparatus can be omitted.

What is claimed is:

1. A wavelength correction apparatus for correcting a deviation of a testing wavelength from a reference wavelength, comprising:
    a reference light source for emitting a reference light of a specific wavelength;
    a light input terminal for inputting a testing light whose wavelength is to be measured and compensated, if required;
    an optical switch for receiving said testing light and said reference light and outputting one of either said testing light or said reference light from an output terminal;
    a control section for controlling operations of said reference light source and said optical switch;
    a light spectrum measuring device that provides at least an element that transforms the light output from said optical switch to parallel waves;
    a diffraction grating that spatially separates said parallel waves;
    an element that converges the light spatially separated by said diffraction grating on an output slit; and
    a processing unit that sets in advance the wavelength of said reference light, and at the same time determines the wavelength of the light that passes through said output slit depending on the orientation angle of said diffraction grating with respect to said parallel waves and measures the spectrum of the light output from said optical switch; and wherein;
    said light spectrum measuring device apparatus inputs the reference light from said reference light source by controlling said optical switch, and adjusts the orientation angle of said diffraction grating with respect to said parallel waves based on the error between the result of measuring the spectrum of said reference light and the wavelength of said reference light that has been set by said processing unit and
    an optical spectrum measuring device for measuring optical spectra output from said optical switch, and for activating said control section automatically at scheduled times specified by an operator.

2. An apparatus according to claim 1, wherein said light spectrum measuring device further comprises:
    a photodetector for converting light exiting from said output slit into electrical signals;
    a conversion section for converting analog signals output from said photodetector into digital signals; and wherein:
    said light spectrum measuring device varies the orientation angle of said diffraction grating and obtains the light spectrum by processing the digital signal output from said conversion section.

3. An apparatus according to claim 2, wherein said light spectrum measuring device includes a timer means having calendar functions, and operates said control section according to signals output from said timer means at scheduled times.

4. An apparatus according to claim 2, wherein said light spectrum measuring device includes a timer means having calendar functions, and operates said control section when signals output from said timer means indicates that a specific time interval has elapsed since said apparatus was powered.

5. An apparatus according to claim 1, wherein said reference light source comprises:
    a light emitting diode for emitting light of specific wavelengths;
    an optical element for transforming light output from said light emitting diode into parallel light;
    a gaseous absorption cell for absorbing light of a specific wavelength from light transmitted through said optical element; and
    a condensing element for concentrating said light transmitted through said gaseous absorption cell for input into said optical switch.

* * * * *